US008153021B2

United States Patent
Kibe et al.

(10) Patent No.: US 8,153,021 B2
(45) Date of Patent: *Apr. 10, 2012

(54) LIQUID CRYSTAL COMPOSITION AND LIQUID CRYSTAL DISPLAY DEVICE

(75) Inventors: Shigeru Kibe, Chiba (JP); Masayuki Saito, Chiba (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 12/672,052

(22) PCT Filed: Aug. 25, 2008

(86) PCT No.: PCT/JP2008/065083
§ 371 (c)(1),
(2), (4) Date: Feb. 3, 2010

(87) PCT Pub. No.: WO2009/028443
PCT Pub. Date: Mar. 5, 2009

(65) Prior Publication Data
US 2011/0062383 A1    Mar. 17, 2011

(30) Foreign Application Priority Data

Aug. 31, 2007 (JP) ................................. 2007-225684
Apr. 28, 2008 (JP) ................................. 2008-116834

(51) Int. Cl.
*C09K 19/00* (2006.01)
*C09K 19/06* (2006.01)
*C09K 19/32* (2006.01)
*C09K 19/52* (2006.01)

(52) U.S. Cl. ........... 252/299.6; 252/299.01; 252/299.61; 252/299.63; 252/299.66; 252/299.67; 430/20; 428/1.1; 349/1; 349/56; 345/87

(58) Field of Classification Search ............. 252/299.01, 252/299.6, 299.61, 299.63, 299.66, 299.67; 428/1.1; 430/20; 349/1, 56; 345/87
See application file for complete search history.

(56) References Cited

U.S. PATENT DOCUMENTS

| 3,660,505 | A | 5/1972 | Starnes et al. |
| 5,728,319 | A | 3/1998 | Matsui et al. |
| 5,858,270 | A | 1/1999 | Matsui et al. |
| 7,951,433 | B2 * | 5/2011 | Tanaka ........................ 428/1.1 |
| 7,976,913 | B2 * | 7/2011 | Hiraoka et al. ............... 428/1.1 |
| 2003/0213935 | A1 | 11/2003 | Heckmeier et al. |
| 2006/0210724 | A1 | 9/2006 | Heckmeier et al. |
| 2006/0286308 | A1 | 12/2006 | Kirsch et al. |

FOREIGN PATENT DOCUMENTS

| DE | 4006921 | 3/1990 |
| WO | 2005/019377 | 3/2005 |
| WO | 2006/061094 | 6/2006 |
| WO | 2008/105286 | 9/2008 |

* cited by examiner

*Primary Examiner* — Geraldina Visconti
(74) *Attorney, Agent, or Firm* — J.C. Patents

(57) ABSTRACT

Disclosed are: a liquid crystal composition which satisfies at least one property selected from a high upper limit temperature in a nematic phase, a low lower limit temperature in a nematic phase, a low viscosity, high optical anisotropy, high dielectric anisotropy, a high specific resistance, high stability against ultraviolet ray, high stability against heat and the like or has a proper balance between at least two properties selected from the above-mentioned properties; and an AM element having a short response time, a high voltage holding ratio, a high contrast ratio, a long service life and the like. Specifically disclosed are: a liquid crystal composition which comprises a specific pentacyclic compound having high optical anisotropy and high dielectric anisotropy as the first component, a specific compound having a low viscosity as the second component, and a specific tetracyclic compound having a high upper limit temperature as the third component, and which shows a nematic phase; and a liquid crystal display element comprising the composition.

20 Claims, No Drawings

LIQUID CRYSTAL COMPOSITION AND LIQUID CRYSTAL DISPLAY DEVICE

TECHNICAL FIELD

The invention relates mainly to a liquid crystal composition suitable for use in an active matrix (AM) device, and an AM device containing the composition. The invention relates particularly to a liquid crystal composition having a positive dielectric anisotropy, and to a device of a twisted nematic (TN) mode, an optically compensated bend (OCB) mode, an in-plane switching (IPS) mode or a polymer sustained alignment (PSA) mode containing the composition.

BACKGROUND ART

In a liquid crystal display device, a classification based on the operation mode of liquid crystals includes phase change (PC), twisted nematic (TN), super twisted nematic (STN), electrically controlled birefringence (ECB), optically compensated bend (OCB), in-plane switching (IPS), vertical alignment (VA), polymer sustained alignment (PSA), and so forth. A classification based on a driving mode includes a passive matrix (PM) and an active matrix (AM). The PM is further classified into static, multiplex and so forth, and the AM is further classified into a thin film transistor (TFT), a metal-insulator-metal (MIM) and so forth. The TFT is further classified into amorphous silicon and polycrystal silicon. The latter is classified into a high-temperature type and a low-temperature type according to a production process. A classification based on a light source includes a reflection type utilizing natural light, a transmission type utilizing a backlight, and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes a relationship between the general characteristics of the two. The general characteristics of the composition will be explained further based on a commercially available AM device. A temperature range of a nematic phase relates to a temperature range in which the device can be used. A desirable maximum temperature of the nematic phase is 70° C. or more and a desirable minimum temperature is −10° C. or less. The viscosity of the composition relates to the response time of the device. A short response time is desirable for displaying moving images with the device. Accordingly, a small viscosity of the composition is desirable. A small viscosity at a low temperature is more desirable.

TABLE 1

General Characteristics of Liquid Crystal Composition and AM Device

| No. | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is positively or negatively large | Threshold voltage is low and electric power consumption is small Contrast ratio is large |

TABLE 1-continued

General Characteristics of Liquid Crystal Composition and AM Device

| No. | General Characteristics of a Composition | General Characteristics of an AM Device |
|---|---|---|
| 5 | Specific resistance is large | Voltage holding ratio is large and a contrast ratio is large |
| 6 | It is stable to ultraviolet light and heat | Service life is long |

[1]A liquid crystal composition can be injected into a cell in a short time.

The optical anisotropy of the composition relates to the contrast ratio of the device. The product (Δn×d) of the optical anisotropy (Δn) of the composition and the cell gap (d) of the device is designed in order to maximize the contrast ratio. A suitable value of the product depends on the kind of operation modes. In a device having a TN mode or the like, a suitable value is 0.45 μm. In this case, a composition having a large optical anisotropy is desirable for a device having a small cell gap. A large dielectric anisotropy of the composition contributes to a low threshold voltage, a small electric power consumption and a large contrast ratio. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. The stability of the composition to ultraviolet light and heat relates to the service life of the liquid crystal display device. In the case where the stability is high, the device has a long service life. These characteristics are desirable for an AM device used in a liquid crystal projector, a liquid crystal television and so forth.

A composition having a positive dielectric anisotropy is used for an AM device having a TN mode. On the other hand, a composition having a negative dielectric anisotropy is used for an AM device having a VA mode. A composition having a positive or negative dielectric anisotropy is used for an AM device having an IPS mode. A composition having a positive or negative dielectric anisotropy is used for an AM device having a PSA mode. Examples of the liquid crystal composition having a positive dielectric anisotropy are disclosed in the following patent documents.
[Patent Document 1] DE 4006921
[Patent Document 2] WO 1996/011897
[Patent Document 3] JP 2003-176251
[Patent Document 4] WO 2005/019377

A desirable AM device is characterized as having a usable temperature range that is wide, response time that is short, a contrast ratio that is large, threshold voltage that is low, a voltage holding ratio that is large, a service life that is long, and so forth. Even one millisecond shorter response time is desirable. Thus, a composition having characteristics such as a high maximum temperature of a nematic phase, a low minimum temperature of a nematic phase, a small viscosity, a large optical anisotropy, a large dielectric anisotropy, a large specific resistance, a high stability to ultraviolet light, a high stability to heat, and so forth is especially desirable.

DISCLOSURE OF THE INVENTION

[Problems to be Solved by the Invention]
An object of the invention is to provide a liquid crystal composition that satisfies many characteristics among the characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat. Another object of the invention is to provide a liquid crystal composition that is properly balanced regarding many characteristics. Still another object of the invention is to provide a liquid crystal display device that contains the liquid crystal composition. A further object of the invention is to provide a liquid crystal composition that has a large optical anisotropy, a large dielectric anisotropy, a high stability to ultraviolet light and so forth, and is to provide an AM device that has a short response time, a large voltage holding ratio, a large contrast ratio, a long service life and so forth.

[Means for Solving the Problems]

The invention concerns a liquid crystal composition having a nematic phase that includes three components, wherein the first component is at least one compound selected from the group of compounds represented by formulas (1-1) and (1-2), the second component is at least one compound selected from the group of compounds represented by formula (2), and the third component is at least one compound selected from the group of compounds represented by formula (3):

the characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat. Another of the advantages of the invention is to provide a liquid crystal composition that is properly balanced regarding many characteristics. Another of the advantages of the invention is to provide a liquid crystal display device that contains the liquid crystal composition. One aspect of the invention is to provide a liquid crystal composition that has a large optical anisotropy, a large dielectric anisotropy, a high stability to ultraviolet light and so forth, and is to provide an AM device that has a short response time, a large voltage holding ratio, a large contrast ratio, a long service life and so forth.

BEST MODE FOR CARRYING OUT THE INVENTION

The terms used in the specification and claims are defined as follows. The liquid crystal composition or the liquid crystal display device of the invention may occasionally be expressed simply as "the composition" or "the device," respectively. A liquid crystal display device is a generic term

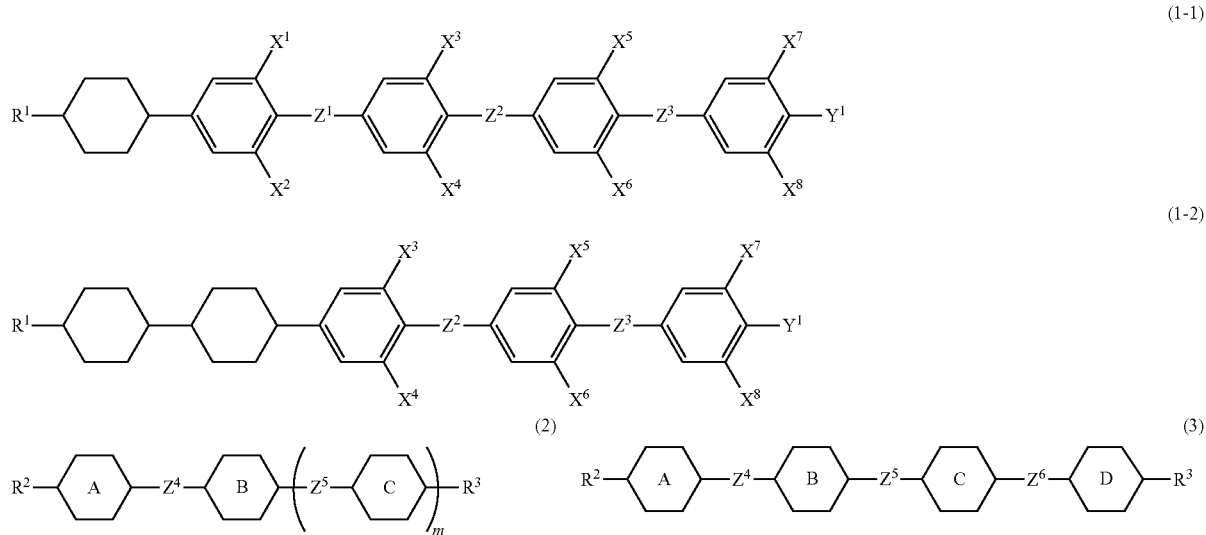

wherein $R^1$ is alkyl having 1 to 12 carbons, alkoxy having 1 to 12 carbons or alkenyl having 2 to 12 carbons; $R^2$ and $R^3$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring A, ring B, ring C and ring D are each independently 1,4-cyclohexylene, 1,4-phenylene, 2-fluoro-1,4-phenylene, or 3-fluoro-1,4-phenylene, or 2,5-difluoro-1,4-phenylene; $Z^1$, $Z^2$ and $Z^3$ are each independently a single bond, ethylene, carbonyloxy, or difluoromethyleneoxy; at least one of $Z^1$, $Z^2$ and $Z^3$ is difluoromethyleneoxy; $Z^4$, $Z^5$ and $Z^6$ are each independently a single bond, ethylene, or carbonyloxy; $X^1$, $X^2$, $X^3$, $X^4$, $X^5$, $X^6$, $X^7$ and $X^8$ are each independently hydrogen or fluorine; $Y^1$ is fluorine, chlorine or trifluoromethoxy; and m is 0 or 1.

[Advantages of the Invention]

One of the advantages of the invention is to provide a liquid crystal composition that satisfies many characteristics among for a liquid crystal display panel and a liquid crystal display module. The "liquid crystal compound" is a generic term for a compound having a liquid crystal phase such as a nematic phase and a smectic phase, and also for a compound having no liquid crystal phase but being useful as a component of a composition. The useful compound contains a 6-membered ring such as 1,4-cyclohexylene and 1,4-phenylene, and its molecular structure is rod-like. An optically active compound or a polymerizable compound may occasionally be added to the composition. Even in the case where the compound is a liquid crystal compound, the compound is classified into an additive herein. At least one compound selected from the group of compounds represented by formula (1-1) may be abbreviated to "the compound (1-1)." "The compound (1-1)" means one compound or two or more compounds represented by formula (1-1). The other formulas are applied with the same rules. The term "arbitrary" indicates that both the position and the number are arbitrary, excluding the case where the number is 0.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, and that the composition has a large specific resistance at room temperature and also at a high temperature even after it has been used for a long time. "A voltage holding ratio is large" means that a device has a large voltage holding ratio at room temperature and also at a high temperature in the initial stage, and that the device has a large voltage holding ratio at room temperature and also at a high temperature even after it has been used for a long time. In the description of the characteristics such as the optical anisotropy, measured values obtained by the methods disclosed in Examples are used. The first component is one compound or two or more compounds. "A ratio of the first component" means the percentage by weight (% by weight) based on the total weight of a liquid crystal composition. A ratio of the second component and so forth are applied with the same rule. A ratio of an additive mixed with the composition means the percentage by weight (% by weight) based on the total weight of a liquid crystal composition.

The symbol $R^1$ was used for a plurality of compounds in the chemical formulas for component compounds. In these compounds, two arbitrary $R^1$ maybe identical or different. In one case, for example, $R^1$ of the compound (1-1) is ethyl and $R^1$ of the compound (1-2) is ethyl. In another case, $R^1$ of the compound (1-1) is ethyl and $R^1$ of the compound (1-2) is propyl. The same rule applies to $R^2$, $R^3$, and so forth. "CL" in the chemical formulas represents chlorine.

The invention has the following features:

Item 1. The invention concerns a liquid crystal composition having a nematic phase that includes three components, wherein the first component is at least one compound selected from the group of compounds represented by formulas (1-1) and (1-2), the second component is at least one compound selected from the group of compounds represented by formula (2), and the third component is at least one compound selected from the group of compounds represented by formula (3):

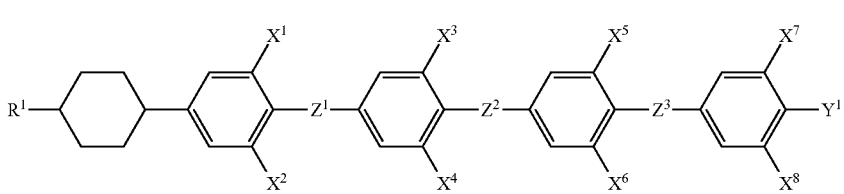

(1-1)

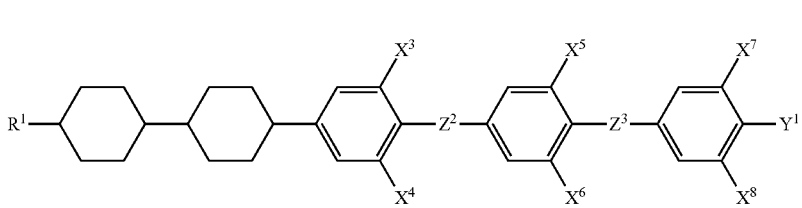

(1-2)

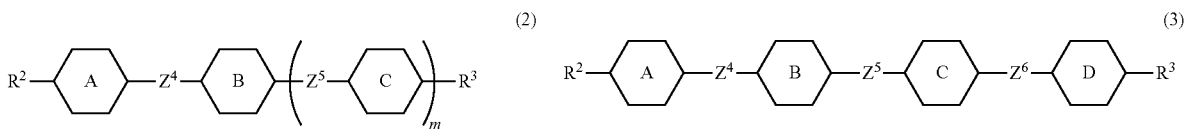

(2) (3)

wherein $R^1$ is alkyl having 1 to 12 carbons, alkoxy having 1 to 12 carbons or alkenyl having 2 to 12 carbons; $R^2$ and $R^3$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring A, ring B, ring C and ring D are each independently 1,4-cyclohexylene, 1,4-phenylene, 2-fluoro-1,4-phenylene, 3-fluoro-1,4-phenylene, or 2,5-difluoro-1,4-phenylene; $Z^1$, $Z^2$ and $Z^3$ are each independently a single bond, ethylene, carbonyloxy or difluoromethyleneoxy; at least one of $Z^1$, $Z^2$ and $Z^3$ is difluoromethyleneoxy; $Z^4$, $Z^5$ and $Z^6$ are each independently a single bond, ethylene or carbonyloxy; $X^1$, $X^2$, $X^3$, $X^4$, $X^5$, $X^6$, $X^7$ and $X^8$ are each independently hydrogen or fluorine; $Y^1$ is fluorine, chlorine or trifluoromethoxy; and m is 0 or 1.

Item 2. The liquid crystal composition according to item 1, wherein the first component is at least one compound selected from the group of compounds represented by formulas (1-1-1) to (1-1-3), (1-2-1) and (1-2-2).

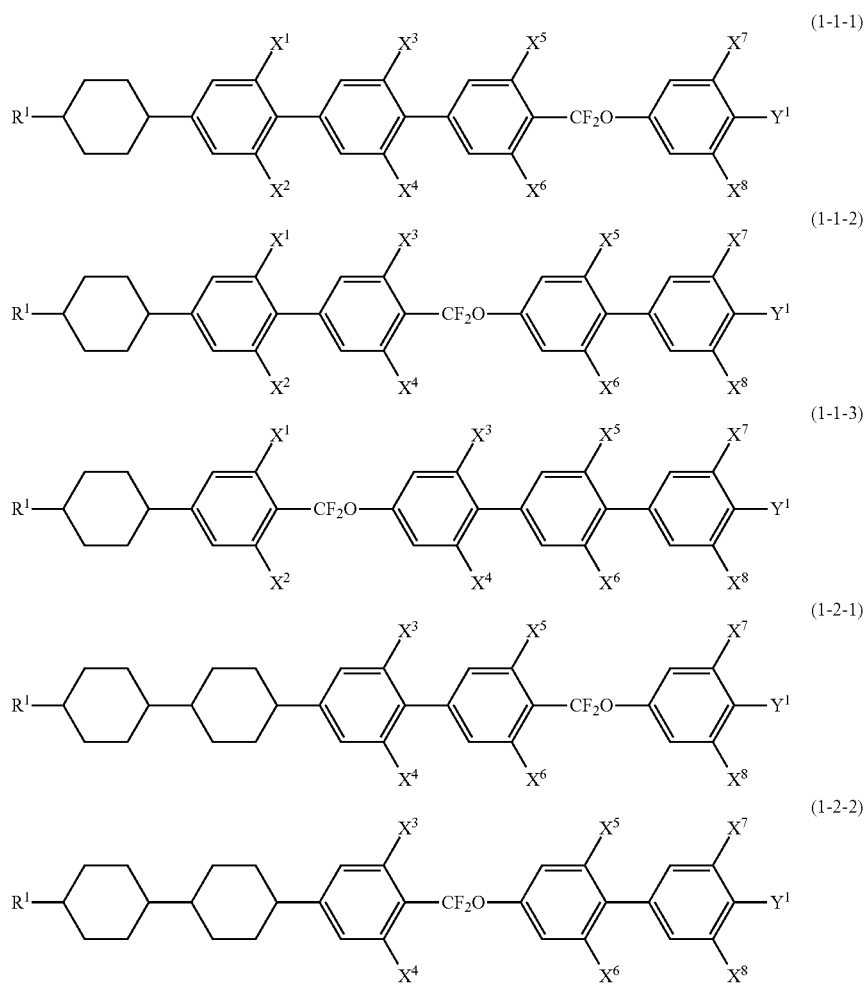

Wherein $R^1$ is alkyl having 1 to 12 carbons, alkoxy having 1 to 12 carbons or alkenyl having 2 to 12 carbons; $X^1$, $X^2$, $X^3$, $X^4$, $X^5$, $X^6$, $X^7$, and $X^8$ are each independently hydrogen or fluorine; and $Y^1$ is fluorine, chlorine or trifluoromethoxy.

Item 3. The liquid crystal composition according to item 2, wherein the first component is at least one compound selected from the group of compounds represented by formulas (1-1-1) and (1-2-2).

Item 4. The liquid crystal composition according to any one of items 1 to 3, wherein the second component is at least one compound selected from the group of compounds represented by formulas (2-1) to (2-6).

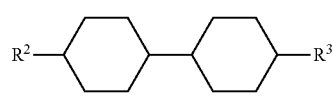
(2-1)

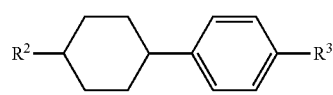
(2-2)

-continued

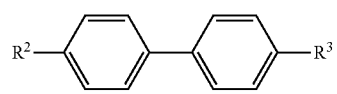
(2-3)

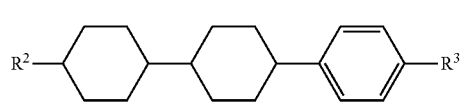
(2-4)

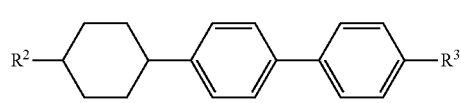
(2-5)

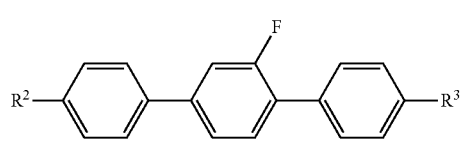
(2-6)

Wherein $R^2$ and $R^3$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 5. The liquid crystal composition according to item 4, wherein the second component is at least one compound selected from the group of compounds represented by formula (2-1).

Item 6. The liquid crystal composition according to item 4, wherein the second component is at least one compound selected from the group of compounds represented by formula (2-6).

Item 7. The liquid crystal composition according to item 4, wherein the second component is a mixture of at least one compound selected from the group of compounds represented by formula (2-1), and at least one compound selected from the group of compounds represented by formula (2-4).

Item 8. The liquid crystal composition according to item 4, wherein the second component is a mixture of at least one compound selected from the group of compounds represented by formula (2-1), and at least one compound selected from the group of compounds represented by formula (2-6).

Item 9. The liquid crystal composition according to item 4, wherein the second component is a mixture of at least one compound selected from the group of compounds represented by formula (2-1), at least one compound selected from the group of compounds represented by formula (2-4), and at least one compound selected from the group of compounds represented by formula (2-6).

Item 10. The liquid crystal composition according to any one of items 1 to 9, wherein the third component is at least one compound selected from the group of compounds represented by formulas (3-1) to (3-4).

ponent is in the range of 5% to 25% by weight, the ratio of the second component is in the range of 30% to 80% by weight, and the ratio of the third component is in the range of 5% to 25% by weight, based on the total weight of the liquid crystal composition.

Item 13. The liquid crystal composition according to any one of items 1 to 12, wherein the composition further includes at least one compound selected from the group of compounds represented by formula (4) as the fourth component.

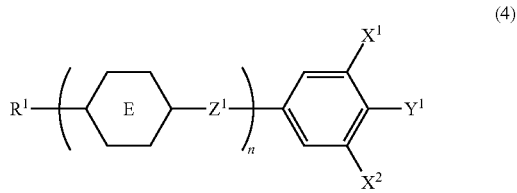

Wherein $R^1$ is alkyl having 1 to 12 carbons, alkoxy having 1 to 12 carbons or alkenyl having 2 to 12 carbons; ring E is independently 1,4-cyclohexylene, 1,3-dioxane-2,5-diyl, 1,4-phenylene, 3-fluoro-1,4-phenylene, 3,5-difluoro-1,4-phenylene, or 2,5-pyrimidine; $Z^1$ is independently a single bond, ethylene, carbonyloxy, or difluoromethyleneoxy; $X^1$ and $X^2$ are each independently hydrogen or fluorine; $Y^1$ is fluorine, chlorine or trifluoromethoxy; and n is 1, 2 or 3.

Item 14. The liquid crystal composition according to item 13, wherein the fourth component is at least one compound selected from the group of compounds represented by formulas (4-1) to (4-17).

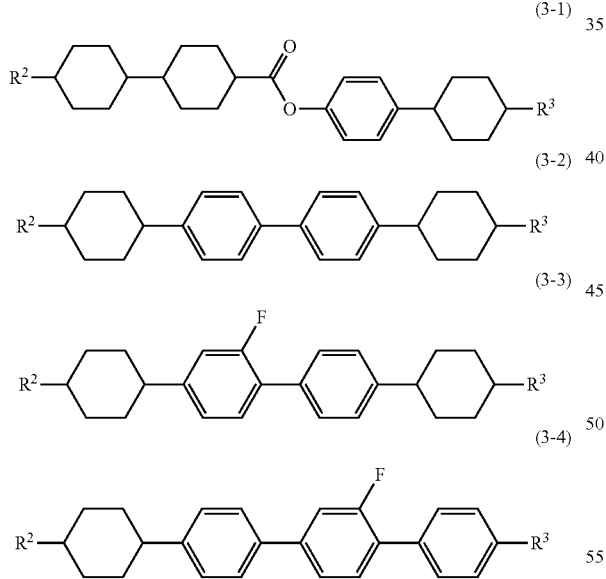

Wherein $R^2$ and $R^3$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 11. The liquid crystal composition according to item 10, wherein the third component is at least one compound selected from the group of compounds represented by formula (3-4).

Item 12. The liquid crystal composition according to any one of items 1 to 11, wherein the ratio of the first com-

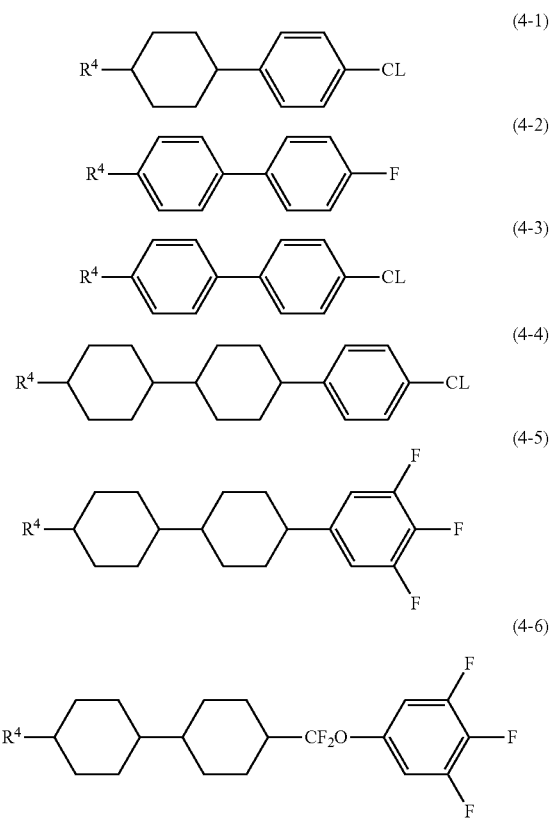

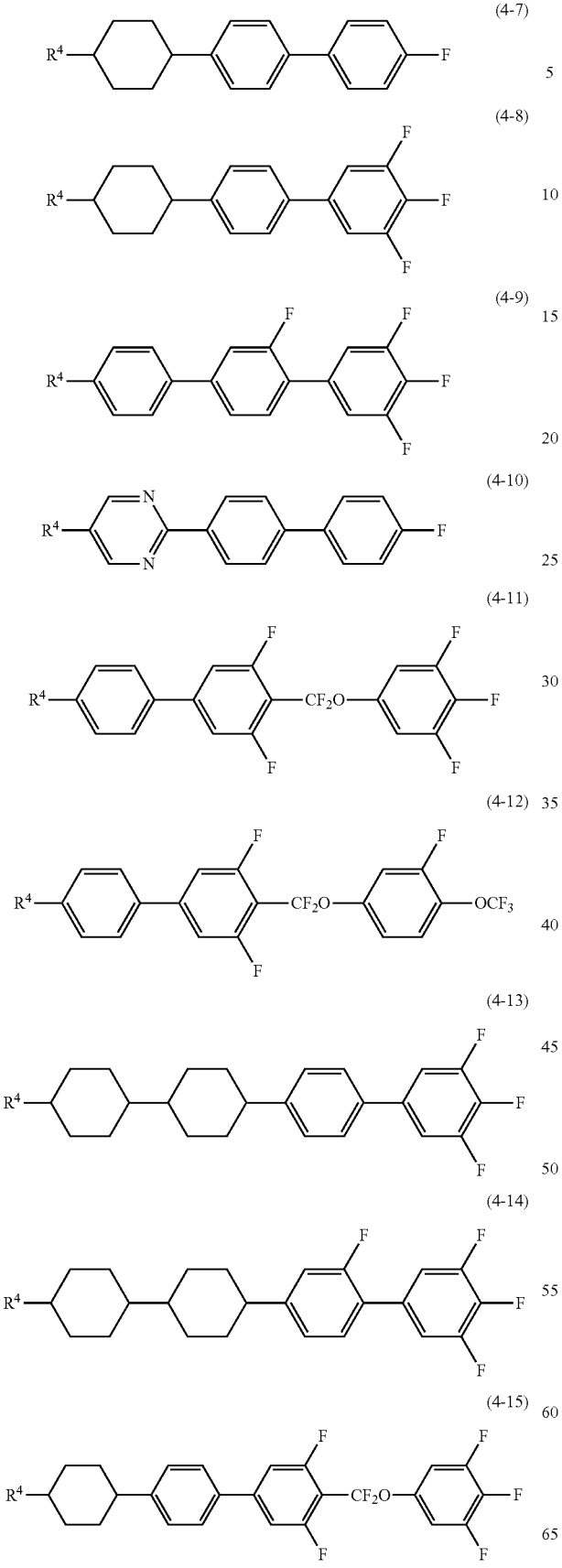

Wherein R⁴ is alkyl having 1 to 12 carbons, or alkenyl having 2 to 12 carbons.

Item 15. The liquid crystal composition according to item 14, wherein the fourth component is at least one compound selected from the group of compounds represented by formula (4-9).

Item 16. The liquid crystal composition according to item 14, wherein the fourth component is at least one compound selected from the group of compounds represented by formula (4-10).

Item 17. The liquid crystal composition according to item 14, wherein the fourth component is at least one compound selected from the group of compounds represented by formula (4-11).

Item 18. The liquid crystal composition according to item 14, wherein the fourth component is at least one compound selected from the group of compounds represented by formula (4-17).

Item 19. The liquid crystal composition according to item 14, wherein the fourth component is a mixture of at least one compound selected from the group of compounds represented by formula (4-6) and at least one compound selected from the group of compounds represented by formula (4-11).

Item 20. The liquid crystal composition according to item 14, wherein the fourth component is a mixture of at least one compound selected from the group of compounds represented by formula (4-9) and at least one compound selected from the group of compounds represented by formula (4-11).

Item 21. The liquid crystal composition according to item 14, wherein the fourth component is a mixture of at least one compound selected from the group of compounds represented by formula (4-11) and at least one compound selected from the group of compounds represented by formula (4-17).

Item 22. The liquid crystal composition according to any one of items 13 to 21, wherein the ratio of the first component is in the range of 5% to 25% by weight, the ratio of the second component is in the range of 30% to 80% by weight, and the ratio of the third component is in the range of 5% to 25% by weight, and the ratio of the fourth component is in the range of 5% to 45%, based on the total weight of the liquid crystal composition.

Item 23. The liquid crystal composition according to any one of items 1 to 22, wherein the composition has a maximum temperature of a nematic phase of 70° C. or more, an optical anisotropy (25° C.) at a wavelength of 589 nm of 0.08 or more, and a dielectric anisotropy (25° C.) at a frequency of 1 kHz of 2 or more.

Item 24. A liquid crystal display device contains the liquid crystal composition according to any one of items 1 to 23.

Item 25. The liquid crystal display device according to item 24, wherein the operation mode of the liquid crystal display device is a twisted nematic (TN) mode, an optically compensated bend (OCB) mode, or an in-plane switching (IPS) mode, and the driving mode of the liquid crystal display device is an active matrix mode.

Item 26. The liquid crystal display device according to item 24, wherein the operation mode of the liquid crystal display device is a polymer sustained alignment (PSA) mode, and the driving mode of the liquid crystal display device is an active matrix mode.

The invention further includes: (1) the composition described above, wherein the composition further contains an optically active compound; (2) the composition described above, wherein the composition further contains an additive, such as an antioxidant, an ultraviolet light absorbent, an antifoaming agent, a polymerizable compound, and/or a polymerization initiator; (3) an AM device containing the composition described above; (4) a device having a TN, ECB, OCB, IPS, or PSA, containing the composition described above; (5) a device of a transmission type, containing the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, the main characteristics of the component compounds and the main effects of the compounds on the composition will be explained. Third, the combinations of the components in the composition, a desirable ratio of the component compounds, and the basis thereof will be explained. Fourth, a desirable embodiment of the component compounds will be explained. Fifth, examples of the component compounds will be shown. Sixth, additives that may be added to the composition will be explained. Seventh, the methods for preparing the component compounds will be explained. Lastly, use of the composition will be explained.

First, the constitution of component compounds in the composition will be explained. The composition of the invention is classified into a composition A and a composition B. The composition A may further contain other liquid crystal compounds, an additive, an impurity, and so forth. "The other liquid crystal compounds" are different from the compound (1-1), the compound (1-2), the compound (2), the compound (3), and the compound (4). Such compounds are mixed with the composition for the purpose of adjusting the characteristics of the composition. The other liquid crystal compounds desirably contain a smaller amount of a cyano compound from the viewpoint of stability to heat or ultraviolet light. A more desirable ratio of the cyano compound is 0% by weight. The additive includes an optically active compound, an antioxidant, an ultraviolet light absorbent, a coloring matter, an antifoaming agent, a polymerizable compound, a polymerization initiator and so forth. The impurity is a compound and so forth contaminated in a process such as the synthesis of a component compound and so forth. Even in the case where the compound is a liquid crystal compound, it is classified into an impurity.

The composition B is essentially consisting of compounds selected from the compound (1-1), the compound (1-2), the compound (2), the compound (3), and the compound (4). The term."essentially" means that the composition does not contain a liquid crystal compound different from these compounds. The composition B has fewer components as compared to the composition A. The composition B is more desirable than the composition A from the viewpoint of cost reduction. The composition A is more desirable than the composition B from the viewpoint that physical properties can be adjusted further by adding the other liquid crystal compounds.

Second, the main characteristics of the component compounds and the main effects of the compounds on the composition will be explained. The main characteristics of the component compounds are summarized in Table 2. In Table 2, the symbol L represents large or high, the symbol M represents a middle degree, and the symbol S represents small or low. The symbols L, M and S are classifications based on qualitative comparison among the component compounds.

TABLE 2

| Characteristics of Compounds | | | | | |
|---|---|---|---|---|---|
| | Compound | | | | |
| | (1-1) | (1-2) | (2) | (3) | (4) |
| Maximum Temperature | M | M | S-M | L | S-M |
| Viscosity | L | L | S-M | M-L | M-L |
| Optical Anisotropy | L | M-L | S-L | M-L | M-L |
| Dielectric Anisotropy | M-L | M-L | 0 | 0 | S-L |
| Specific Resistance | L | L | L | L | L |

The main effects of the component compounds on the characteristics of the composition upon mixing the component compounds with the composition are as follows. The compound (1-1) and the compound (1-2) increase the optical anisotropy and increase the dielectric anisotropy. The compound (2) increases the maximum temperature or decreases the viscosity. The compound (3) increases the maximum temperature. The compound (4) decreases the minimum temperature and increases the dielectric anisotropy.

Third, the combinations of the components in the composition, desirable ratios of the component compounds, and the basis thereof will be explained. The combinations of the components in the composition are first component+second component+third component, and first component+second component+third component+fourth component.

A desirable ratio of the first component is 5% by weight or more for increasing the optical anisotropy, and is 25% by weight or less for decreasing the minimum temperature. A more desirable ratio is in the range from 5% to 20% by weight. A particularly desirable ratio is in the range from 5% to 15% by weight.

A desirable ratio of the second component is 30% by weight or more for decreasing the viscosity, and is 80% by weight or less for increasing the dielectric anisotropy. A more desirable ratio is in the range from 35% to 75% by weight. A particularly desirable ratio is in the range from 40% to 70% by weight.

A desirable ratio of the third component is 5% by weight or more for increasing the maximum temperature, and is 25% by weight or less for decreasing the minimum temperature. A more desirable ratio is in the range from 5% to 20% by weight. A particularly desirable ratio is in the range from 5% to 15% by weight.

The fourth component is suitable for preparing a composition having a particularly large dielectric anisotropy. A desirable ratio of the component is in the range from 5% to 45% by weight. A more desirable ratio is in the range from 10% to 40% by weight. A particularly desirable ratio is in the range from 15% to 35% by weight.

Fourth, a desirable embodiment of the component compounds will be explained. $R^1$ is alkyl having 1 to 12 carbons, alkoxy having 1 to 12 carbons or alkenyl having 2 to 12 carbons. Desirable $R^1$ is alkyl having 1 to 12 carbons for increasing the stability to ultraviolet light or heat. $R^2$ and $R^3$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Desirable $R^2$ is alkenyl having 2 to 12 carbons for decreasing the minimum temperature or decreasing the viscosity. Desirable $R^3$ is alkyl having 1 to 12 carbons for increasing the stability to ultraviolet light or heat. $R^4$ is alkyl having 1 to 12 carbons or alkenyl having 2 to 12 carbons. Desirable $R^4$ is alkyl having 1 to 12 carbons for increasing the stability to ultraviolet light or heat.

Desirable alkyl is methyl, ethyl, propyl, butyl, pentyl, hexyl, heptyl, or octyl. More desirable alkyl is ethyl, propyl, butyl, pentyl, or heptyl for decreasing the viscosity.

Desirable alkoxy is methoxy, ethoxy, propoxy, butoxy, pentyloxy, hexyloxy, or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl for decreasing the viscosity. A desirable configuration of —CH═CH— in these alkenyls depends on the position of a double bond. Trans is desirable in the alkenyl such as 1-propenyl, 1-butenyl, 1-pentenyl, 1-hexenyl, 3-pentenyl, and 3-hexenyl for decreasing the viscosity. Cis is desirable in the alkenyl such as 2-butenyl, 2-pentenyl and 2-hexenyl. In these alkenyls, linear alkenyl is preferable to branched alkenyl.

Desirable examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl, and 6,6-difluoro-5-hexenyl. More desirable examples are 2,2-difluorovinyl and 4,4-difluoro-3-butenyl for decreasing the viscosity.

Ring A, ring B, ring C and ring D are each independently 1,4-cyclohexylene, 1,4-phenylene, 2-fluoro-1,4-phenylene, 3-fluoro-1,4-phenylene, or 2,5-difluoro-1,4-phenylene. Desirable ring A, ring B and ring C are 1,4-cyclohexylene for decreasing the viscosity, or 1,4-phenylene for increasing the optical anisotropy. Desirable ring D is 3-fluoro-1,4-phenylene for decreasing the minimum temperature. Ring E is 1,4-cyclohexylene, 1,3-dioxan-2,5-diyl, 1,4-phenylene, 3-fluoro-1,4-phenylene, 2,5-difluoro-1,4-phenylene, or 2,5-pyrimidine. When n is 2 or 3, two arbitrary rings E may be the same or different. Desirable ring E is 1,4-phenylene for increasing the optical anisotropy.

$Z^1$, $Z^2$ and $Z^3$ are each independently a single bond, ethylene, carbonyloxy or difluoromethyleneoxy. When n is 2 or 3, two arbitrary $Z^1$ may be the same or different. Desirable $Z^1$, $Z^2$ and $Z^3$ are each independently difluoromethyleneoxy for increasing the dielectric anisotropy. $Z^4$, $Z^5$ and $Z^6$ are each independently a single bond, ethylene, or carbonyloxy. Desirable $Z^4$, $Z^5$ and $Z^6$ are each independently a single bond for decreasing the viscosity.

$X^1$, $X^2$, $X^3$, $X^4$, $X^5$, $X^6$, $X^7$, and $X^8$ are each independently hydrogen or fluorine. Five or more of $X^1$, $X^2$, $X^3$, $X^4$, $X^5$, $X^6$, $X^7$, and $X^8$ are desirably fluorine for increasing the dielectric anisotropy.

$Y^1$ is fluorine, chlorine or trifluoromethoxy. Desirable $Y^1$ is fluorine for decreasing the minimum temperature.

Fifth, examples of the component compounds will be shown. In the desirable compounds described below, $R^5$ is linear alkyl having 1 to 12 carbons. $R^6$ is linear alkyl having 1 to 12 carbons or linear alkoxy having 1 to 12 carbons. $R^7$ and $R^8$ are each independently linear alkyl having 1 to 12 carbons or linear alkenyl having 2 to 12 carbons. On the configuration of 1,4-cyclohexylene, trans is preferable to cis for increasing the maximum temperature.

Desirable compound (1-1) are the compounds (1-1-1-1) to (1-1-1-3), the compounds (1-1-2-1) to (1-1-2-2), and the compound (1-1-3-1). More desirable compound (1-1) are the compounds (1-1-1-1) to (1-1-1-3). Especially desirable compound (1-1) are the compound (1-1-1-1). Desirable compound (1-2) are the compounds (1-2-1-1) and (1-2-2-1). Desirable compound (2) are the compounds (2-1-1) to (2-6-1). More desirable compound (2) are the compound (2-1-1), the compound (2-3-1), the compound (2-4-1), and the compound (2-6-1). Especially desirable compound (2) are the compound (2-1-1), the compound (2-4-1) and the compound (2-6-1). Desirable compound (3) are the compounds (3-1-1) to (3-4-1). More desirable compound (3) are the compound (3-4-1). Desirable compound (4) are the compounds (4-1-1) to (4-23). More desirable compound (4) are the compound (4-9-1), the compound (4-11-1), the compound (4-15-1) and the compound (4-17-1). Especially desirable compound (4) is the compound (4-11-1) and the compound (4-17-1).

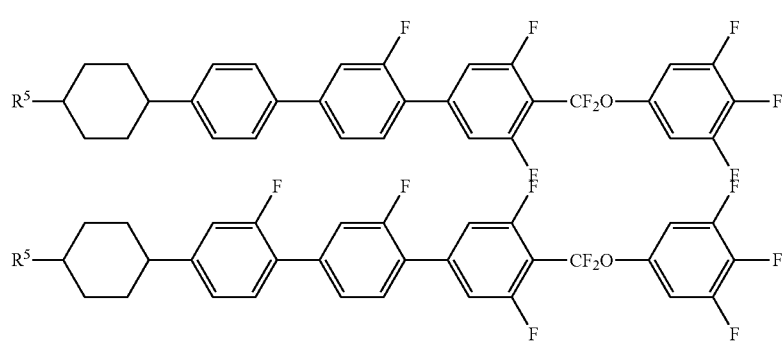

(1-1-1-1)

(1-1-1-2)

-continued
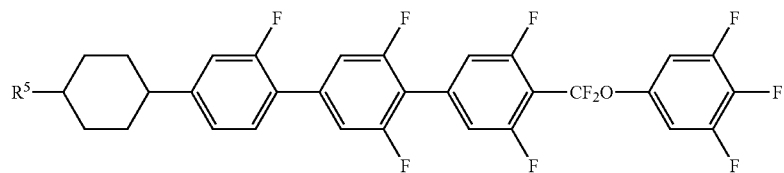
(1-1-1-3)
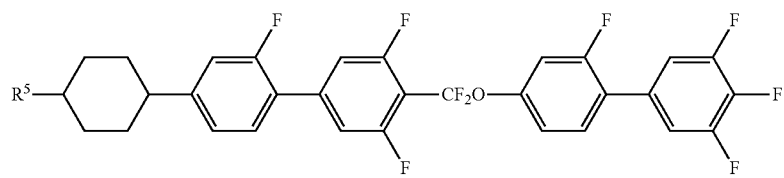
(1-1-2-1)
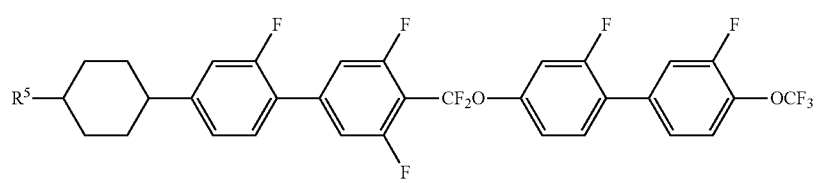
(1-1-2-2)
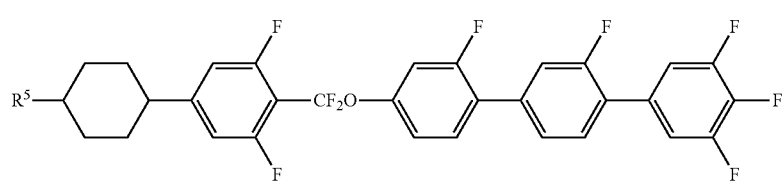
(1-1-3-1)
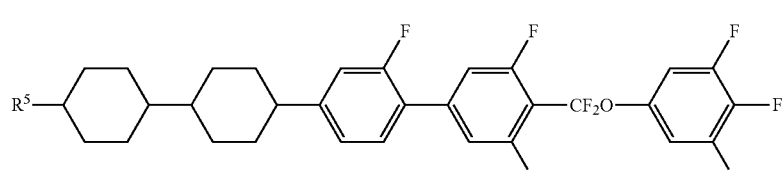
(1-2-1-1)
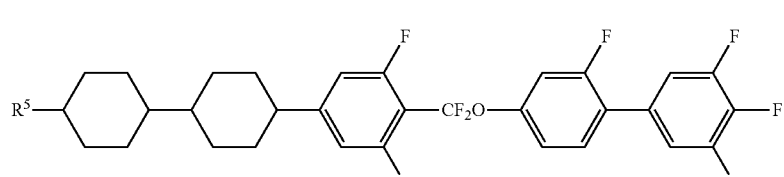
(1-2-2-1)
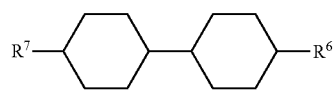
(2-1-1)
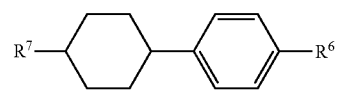
(2-2-1)
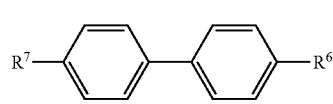
(2-3-1)
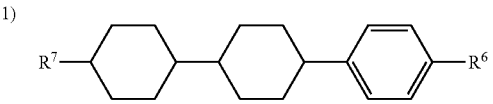
(2-4-1)
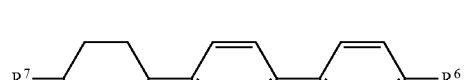
(2-5-1)
(2-6-1)
(3-1-1)
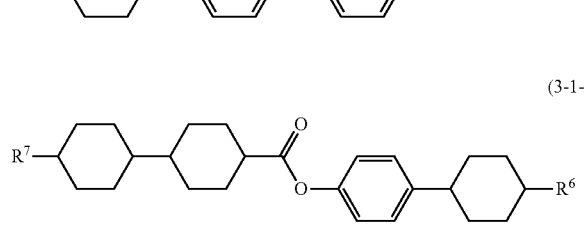
(3-2-1)
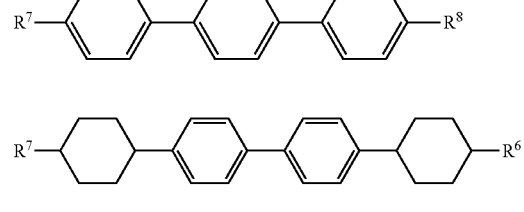

-continued
(3-3-1)
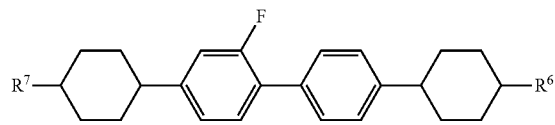
(3-4-1)
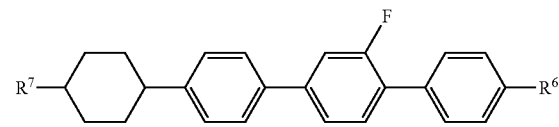
(4-1-1)
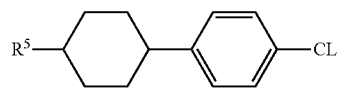
(4-2-1)
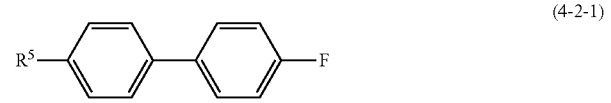
(4-3-1)
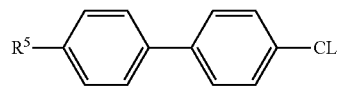
(4-4-1)
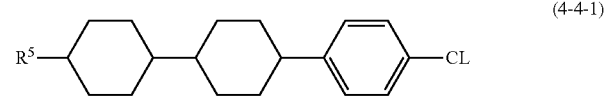
(4-5-1)
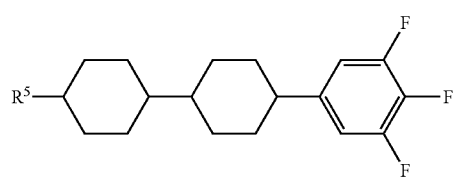
(4-6-1)
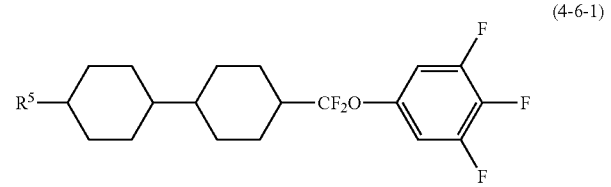
(4-7-1)
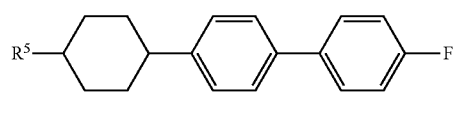
(4-8-1)
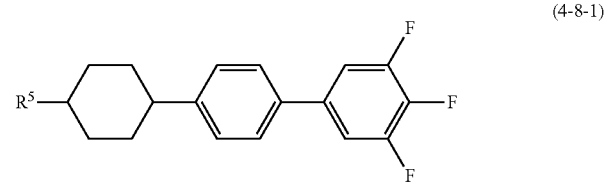
(4-9-1)
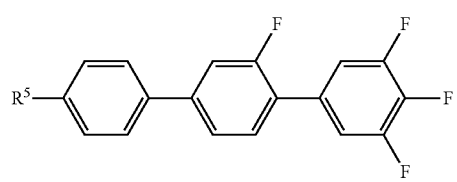
(4-10-1)
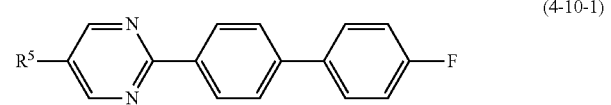
(4-11-1)
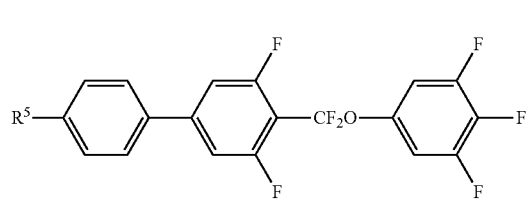
(4-12-1)
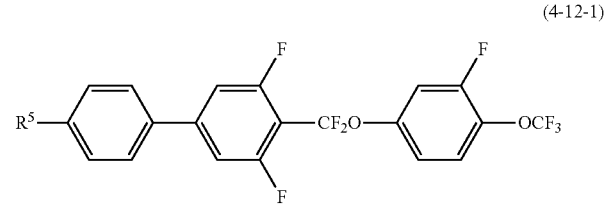
(4-13-1)
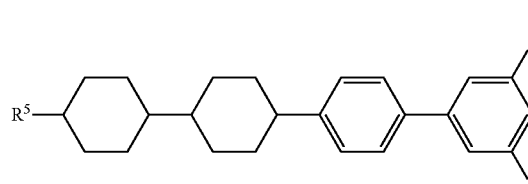
(4-14-1)
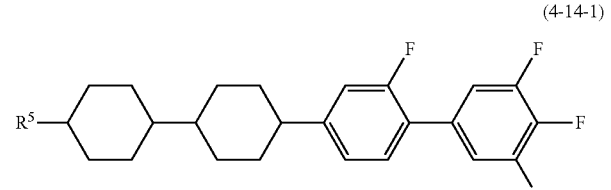
(4-15-1)
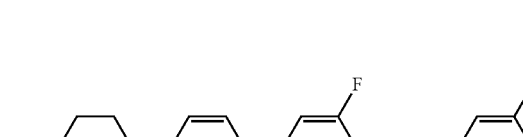
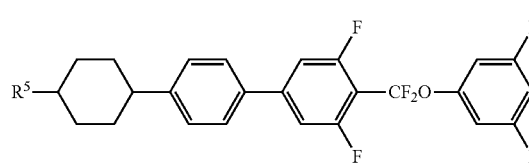
(4-16-1)
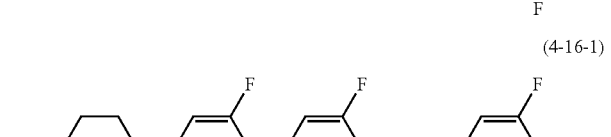
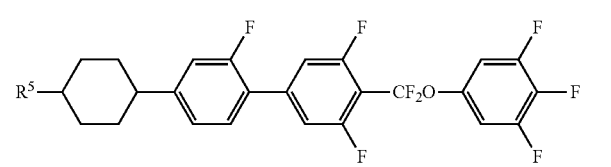

-continued (4-17-1) 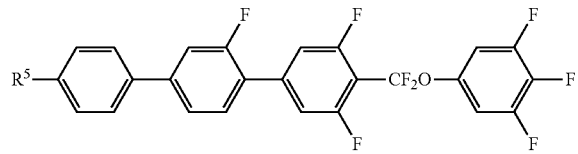

(4-18) 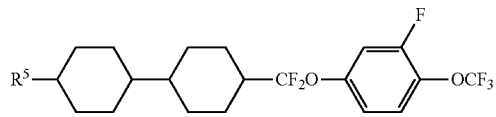

(4-19) 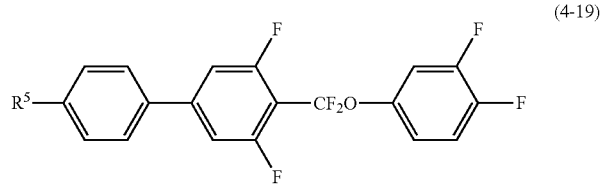

(4-20) 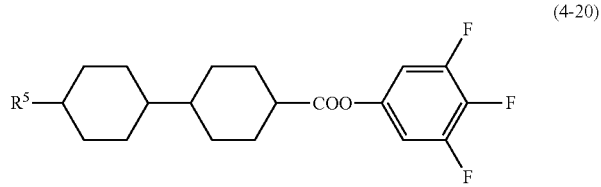

(4-21) 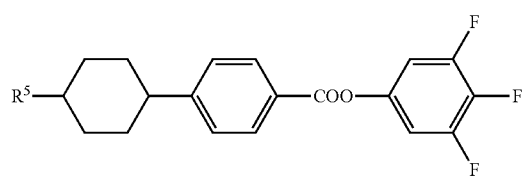

(4-22) 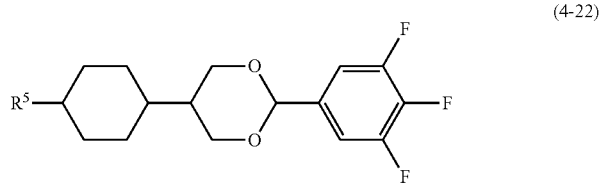

(4-23) 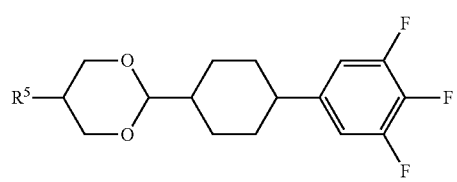

Sixth, additives capable of being mixed with the composition will be explained. The additives include an optically active compound, an antioxidant, an ultraviolet light absorbent, a coloring matter, an antifoaming agent, a polymerizable compound, a polymerization initiator and so forth. An optically active compound is mixed in the composition for inducing the helical structure of liquid crystals to provide a twist angle. Examples of the optically active compound include the compounds (5-1) to (5-4) below. A desirable ratio of the optically active compound is 5% by weight or less. A more desirable ratio is in the range from 0.01% to 2% by weight.

(5-1) 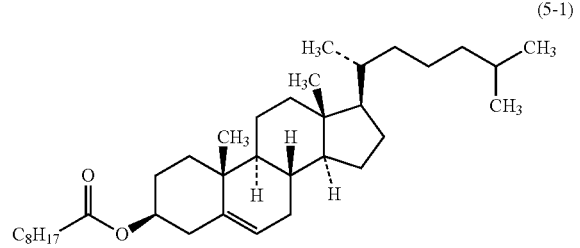

(5-2) 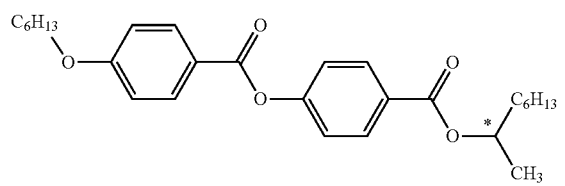

-continued (5-3) 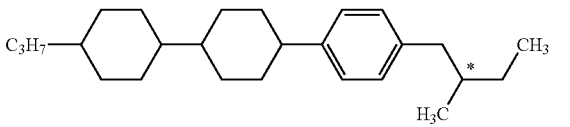

(5-4) 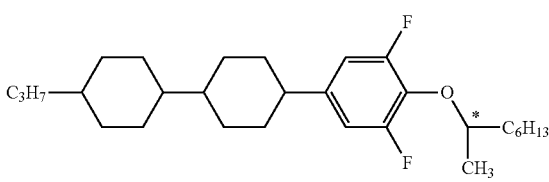

An antioxidant is mixed with the composition in order to avoid a decrease in specific resistance caused by heating in the air, or to maintain a large voltage holding ratio at room temperature and also at a high temperature even after the device has been used for a long time.

(6) 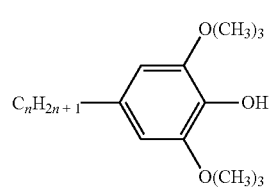

Preferred examples of the antioxidant include the compound (6), wherein n is an integer of from 1 to 9. In the compound (6), desirable n are 1, 3, 5, 7, or 9. More desirable n is 1 or 7. When n is 1, the compound (6) has a large volatility, and is effective in preventing the decrease of specific resistance caused by heating in the air. When n is 7, the compound (6) has a small volatility, and is effective in maintaining a large voltage holding ratio at room temperature and also at a high temperature even after the device has been used for a long time. A desirable ratio of the antioxidant is 50 ppm or more for obtaining the advantage thereof, and is 600 ppm or less for preventing the maximum temperature from being decreased and preventing the minimum temperature from being increased. A more desirable ratio thereof is in the range from 100 ppm to 300 ppm.

Preferred examples of the ultraviolet light absorbent include a benzophenone derivative, a benzoate derivative and a triazole derivative. A light stabilizer such as amine with steric hindrance is also desirable. A desirable ratio of the absorbent or stabilizer is 50 ppm or more for obtaining the advantage thereof, and is 10,000 ppm or less for preventing the maximum temperature from being decreased and preventing the minimum temperature from being increased. A more desirable ratio thereof is in the range from 100 ppm to 10,000 ppm.

A dichroic dye such as an azo dye or an anthraquinone dye is mixed with the composition to suit for a device of a guest host (GH) mode. A desirable ratio of the dye is in the range from 0.01% to 10% by weight. An antifoaming agent such as dimethyl silicone oil or methylphenyl silicone oil is added to the composition to prevent foaming. A desirable ratio of the antifoaming agent is 1 ppm or more for obtaining the advantage thereof, and is 1,000 ppm or less for preventing defective indication. A more desirable ratio thereof is in the range from 1 ppm to 500 ppm.

A polymerizable compound is mixed with the composition to suit for a device of a polymer sustained alignment (PSA) mode. Preferred examples of the polymerizable compound include a compound having a polymerizable group, such as acrylate, methacrylate, vinyl compounds, vinyloxy compounds, propenyl ether, epoxy compounds (oxirane, oxetane), and vinyl ketone. An especially desirable example is a derivative of acrylate or methacrylate. A desirable ratio of the polymerizable compound is 0.05% by weight or more for obtaining the advantage thereof, and is 10% by weight or less for preventing defective displaying. A more desirable ratio thereof is in the range from 0.1% to 2% by weight. The polymerizable compound is desirably polymerized by UV irradiation and so forth in the presence of a suitable initiator such as a photo-polymerization initiator. Suitable conditions for the polymerization, a suitable type of initiators and suitable amounts are known to those skilled in the art, and are described in the literature. For example, Irgacure 651 (registered trademark), Irgacure 184 (registered trademark) or Darocure 1173 (registered trademark) (Ciba Geigy AG) that are photo-polymerization initiators are suitable for radical polymerization. The polymerizable compound desirably contains a photo-polymerization initiator in the range of 0.1% to 5% by weight. The polymerizable compound contains especially desirably a photopolymerization initiator in the range of 1% to 3% by weight.

Seventh, the methods for preparing the component compounds will be explained. These compounds can be prepared by known methods. The methods for the preparation will be exemplified below. The compounds (1-2-1), (4-11-1) and (4-17-1) are prepared by the method disclosed in JP H10-251186 A (1998). The compounds (4-5-1) and (4-8-1) are prepared by the method disclosed in JP H2-233626 A (1990). The compounds (2-1-1) and (2-4-1) are prepared by the method disclosed in JP H4-30382 B (1992). Antioxidants are commercially available. The compound of formula (6) wherein n is 1 is commercially available from Sigma-Aldrich Corporation. The compound (6) wherein n is 7 is prepared according to the method described in U.S. Pat. No. 3,660,505 (1972).

The compounds for which preparation methods were not described above can be prepared according to the methods described in ORGANIC SYNTHESES (John Wiley & Sons, Inc), ORGANIC REACTIONS (John Wiley & Sons, Inc), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth. The composition is prepared according to known methods using the compounds thus obtained. For example, the component compounds are mixed and dissolved in each other by heating.

Last, use of the composition will be explained. The compositions of the invention mainly have a minimum temperature of −10° C. or less, a maximum temperature of 70° C. or more, and an optical anisotropy in the range of 0.07 to 0.20. The device containing the composition has a large voltage holding ratio. The composition is suitable for an AM device. The composition is suitable especially for an AM device of a transmission type. The composition having an optical anisotropy in the range of 0.08 to 0.25 and further the composition having an optical anisotropy in the range of 0.10 to 0.30 may be prepared by controlling the ratios of the component compounds or by mixing with other liquid crystal compounds. The composition can be used as a composition having a nematic phase and as an optically active composition by adding an optically active compound.

The composition can be used for an AM device. It can also be used for a PM device. The composition can also be used for an AM device and a PM device having a mode such as PC, TN, STN, ECB, OCB, IPS, VA, and PSA. It is especially desirable to use the composition for an AM device having a mode of TN, OCB or IPS. These devices may be of a reflection type, a transmission type or a semi-transmission type. It is desirable to use the composition for a device of a transmission type. It can also be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three-dimensional net-work polymer is formed in the composition.

EXAMPLES

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. That is: extrapolated value=(value measured−0.85×value for mother liquid crystals)/0.15. When a smectic phase (or crystals) separated out at this ratio at 25° C., a ratio of the compound to mother liquid crystals was changed step by step in the order of (10% by weight/90% by weight), (5% by weight/95% by weight) and (1% by weight/99% by weight), respectively. Values for a maximum temperature, optical anisotropy, viscosity, and dielectric anisotropy of the compound were obtained by the extrapolation.

The component of the mother liquid crystals is as shown below. The ratio of the component is expressed by weight %.

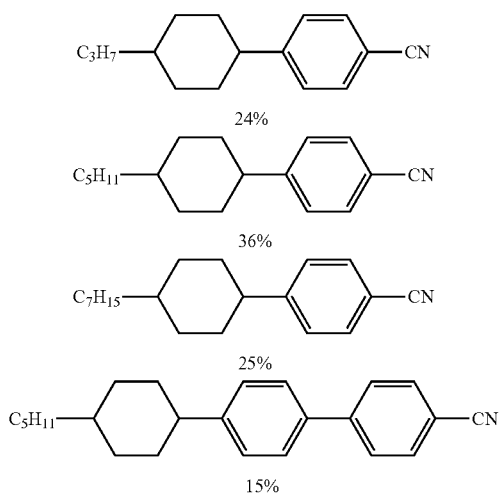

Measurement of the characteristics was carried out according to the following methods. Most methods are described in the Standard of Electronic Industries Association of Japan, EIAJ·ED-2521A or those with some modifications.

Maximum. Temperature of a Nematic Phase (NI; ° C.): A sample was placed on a hot plate in a melting point apparatus equipped with a polarizing microscope and was heated at the rate of 1° C. per minute. A temperature was measured when part of the sample began to change from a nematic phase into an isotropic liquid. A higher limit of a temperature range of a nematic phase may be abbreviated to "a maximum temperature."

Minimum Temperature of a Nematic Phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

Viscosity ($\eta$; measured at 20° C.; mPa·s): Viscosity was measured by means of an E-type viscometer.

Rotation Viscosity ($\gamma1$; measured at 25° C.; mPa·s): Rotation viscosity was measured according to the method disclosed in M. Imai, et al., *Molecular Crystals and Liquid Crystals*, Vol. 259, p. 37 (1995). A sample was placed in a TN device, in which a twist angle was 0°, and the cell gap between two glass plates was 5 µm. The TN device was impressed with a voltage in the range of from 16 V to 19.5 V stepwise by 0.5 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. The rotation viscosity was obtained from the measured values and the calculating equation (8) in the article presented by M. Imai, et al., p. 40. As for the dielectric anisotropy necessary for the calculation, the value measured by the measuring method of dielectric anisotropy described below with the device for measuring the rotation viscosity was used.

Optical Anisotropy ($\Delta n$; measured at 25° C.): Measurement was carried out with an Abbe refractometer mounting a polarizing plate on an ocular using light at a wavelength of 589 nm. The surface of a main prism was rubbed in one direction, and then a sample was dropped on the main prism. A refractive index ($n\|$) was measured when the direction of polarized light was parallel to that of the rubbing. A refractive index ($n\perp$) was measured when the direction of polarized light was perpendicular to that of the rubbing. A value of optical anisotropy was calculated from the equation: $\Delta n = n\| - n\perp$.

Dielectric Anisotropy ($\Delta\in$; measured at 25° C.): A sample having a nematic phase was put in a TN device having a distance between two glass plates (cell gap) of 9 µm and a twist angle of 80°. Sine waves (10 V, 1 kHz) were impressed onto the device, and a dielectric constant ($\in\|$) in a major axis direction of a liquid crystal molecule was measured after 2 seconds. Sine waves (0.5 V, 1 kHz) were impressed onto the device and a dielectric constant ($\in\perp$) in a minor axis direction of a liquid crystal molecule was measured after 2 seconds. A value of a dielectric anisotropy was calculated from the equation: $\Delta\in = \in\| - \in\perp$.

Threshold Voltage (Vth; measured at 25° C.; V): Measurement was carried out with an LCD Evaluation System Model LCD-5100 made by Otsuka Electronics Co., Ltd. The light source was a halogen lamp. A sample was poured into a TN device of a normally white mode, in which the cell gap between two glass plates was 0.45/$\Delta n$ (µm), and a twist angle was 80°. Voltage to be impressed onto the device (32 Hz, rectangular waves) was stepwise increased by 0.02 volt starting from 0 V up to 10 V. During the stepwise increasing, the device was irradiated with light in a perpendicular direction, and the amount of light passing through the device was measured. A voltage-transmission curve was prepared, in which a maximum amount of light corresponded to 100% transmittance and a minimum amount of light corresponded to 0% transmittance. Threshold voltage was a value at 90% transmittance.

Voltage Holding Ratio (VHR-1; measured at 25° C.; %): A TN device used for measurement had a polyimide-alignment film and the cell gap between two glass plates was 5 µm. A sample was poured into the device, and then the device was sealed with an adhesive polymerizable by the irradiation of ultraviolet light. The TN device was impressed and charged with pulse voltage (60 microseconds at 5 V). Decreasing voltage was measured for 16.7 milliseconds with a High Speed Voltmeter and the area A between a voltage curve and a horizontal axis in a unit cycle was obtained. The area B was an area without decreasing. The voltage holding ratio is a percentage of the area A to the area B.

Voltage Holding Ratio (VHR-2; measured at 80° C.; %): A TN device used for measurement had a polyimide-alignment film and the cell gap between two glass plates was 5 µm. A sample was poured into the device, and then the device was sealed with an adhesive polymerizable by the irradiation of ultraviolet light. The TN device was impressed and charged with pulse voltage (60 microseconds at 5V). Decreasing voltage was measured for 16.7 milliseconds with a High Speed Voltmeter and the area A between a voltage curve and a horizontal axis in a unit cycle was obtained. The area B was an area without decreasing. The voltage holding ratio is a percentage of the area A to the area B.

Voltage Holding Ratio (VHR-3; measured at 25° C.; %): A voltage holding ratio was measured after irradiating with ultraviolet light to evaluate stability to ultraviolet light. A composition having a large VHR-3 has a large stability to ultraviolet light. A TN device used for measurement had a polyimide-alignment film and the cell gap was 5 µm. A sample was poured into the device, and then the device was irradiated with light for 20 minutes. The light source was a super-high pressure mercury lamp USH-500D (made by Ushio, Inc.), and the distance between the device and the light source was 20 cm. In measurement of VHR-3, decreasing voltage was measured for 16.7 milliseconds. The VHR-3 is desirably 90% or more, and more desirably 95% or more.

Voltage Holding Ratio (VHR-4; measured at 25° C.; %): A voltage holding ratio was measured after heating a TN device having a sample poured therein in a constant-temperature chamber at 80° C. for 500 hours to evaluate stability to heat. A composition having a large VHR-4 has a large stability to heat. In measurement of VHR-4, decreasing voltage was measured for 16.7 milliseconds.

Response Time (τ; measured at 25° C.; millisecond): Measurement was carried out with an LCD Evaluation System Model LCD-5100 made by Otsuka Electronics Co., Ltd. The light source was a halogen lamp. The low-pass filter was set at 5 kHz. A sample was poured into a TN device of a normally white mode, in which the cell gap between two glass plates was 5.0 μm, and a twist angle was 80°. Rectangular waves (60 Hz, 5 V, 0.5 second) were impressed to the device. During impressing, the device was irradiated with light in a perpendicular direction, and the amount of light passing through the device was measured. A maximum amount of light corresponds to 100% transmittance, and a minimum amount of light corresponds to 0% transmittance. Rise time (τr; millisecond) is the time required for a change in transmittance from 90% to 10%. Fall time (τf; millisecond) is the time required for a change in transmittance from 10% to 90%. Response time is the sum of the rise time and the fall time thus obtained.

Specific Resistance (ρ; measured at 25° C.; Ωcm): A sample of 1.0 ml was poured into a vessel equipped with electrodes. The vessel was impressed with DC voltage (10 V) and a direct current was measured after 10 seconds. Specific resistance was calculated from the following equation: Specific resistance=(voltage×electric capacitance of vessel)/(direct current×dielectric constant in a vacuum).

Gas Chromatographic Analysis: A Gas Chromatograph Model GC-14B made by Shimadzu Corporation was used for measurement. The carrier gas was helium (2 ml per minute). An evaporator and a detector (FID) were set up at 280° C. and 300° C., respectively. A capillary column DB-1 (length 30 m, bore 0.32 mm, film thickness 0.25 μm; dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared in an acetone solution (0.1% by weight), and 1 μl of the solution was injected into the evaporator. A recorder used was a Chromatopac Model C-R5A made by Shimadzu Corporation or its equivalent. A gas chromatogram obtained showed the retention time of a peak and a peak area corresponding to the component compound.

Solvents for diluting the sample may also be chloroform, hexane, and so forth. The following capillary column may also be used: HP-1 made by Agilent Technologies, Inc. (length 30 m, bore 0.32 mm, film thickness 0.25 μm), Rtx-1 made by Restek Corporation (length 30 m, bore 0.32 mm, film thickness 0.25 μm), and BP-1 made by SGE International Pty. Ltd. (length 30 m, bore 0.32 mm, film thickness 0.25 μm). In order to prevent compound peaks from overlapping, a capillary column CBP1-M50-025 (length 50 m, bore 0.25 mm, film thickness 0.25 μm) made by Shimadzu Corporation may be used.

The ratio of liquid crystal compounds contained in the composition may be calculated by the following method. The liquid crystal compounds can be detected with a gas chromatograph. The area ratio of each peak in the gas chromatogram corresponds to the ratio (number of moles) of liquid crystal compounds. When the above capillary columns are used, the correction coefficient of each liquid crystal compound may be regarded as 1. Therefore, the ratio of liquid crystal compounds (% by weight) is calculated from the area ratio of each peak.

The invention will be explained in detail by way of Examples. The invention is not limited by the Examples described below. The compounds described in Comparative Examples and the Examples are expressed by the symbols according to the definition in Table 3. In Table 3, the configuration of 1,4-cyclohexylene is trans. The parenthesized numbers next to the symbolized compounds in the Examples correspond to the numbers of the desirable compounds. The symbol (–) means other liquid crystal compound. The ratios (percentage) of liquid crystal compounds are expressed by percentage by weight (% by weight) based on the total weight of liquid crystal compositions, and the liquid crystal compositions contain impurities in addition to the liquid crystal compounds. Last, the characteristics of the compositions are summarized.

TABLE 3

Method of Description of Compound using Symbols
R—(A$_1$)—Z$_1$—...—Z$_n$—(A$_n$)—R'

| 1) Left Terminal Group R— | Symbol |
| --- | --- |
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF— |
| CF$_2$=CH—C$_n$H$_{2n}$— | VFFn- |

| 2) Right Terminal Group —R' | Symbol |
| --- | --- |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | -nV |
| —CH=CF$_2$ | —VFF |
| —F | —F |
| —Cl | —CL |
| —OCF$_3$ | —OCF3 |

| 3) Biding Group —Z$_n$— | 記号 |
| --- | --- |
| —C$_2$H$_4$— | 2 |
| —COO— | E |
| —CH=CH— | V |
| —C≡C— | T |
| —CF$_2$O— | X |

| 4) Ring Structure —A$_n$— | Symbol |
| --- | --- |
|  | H |
|  | B |
| 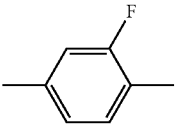 | B(F) |

TABLE 3-continued

Method of Description of Compound using Symbols
R—(A₁)—Z₁— ... —Zₙ—(Aₙ)—R'

| Structure | Symbol |
|---|---|
| Difluorobenzene (2,4-substituted with F at 2) | B(2F) |
| Difluorobenzene (with 2F,3F) | B(F,F) |
| Trifluorobenzene | B(2F,5F) |
| Fluoropyrimidine | Py |
| Dioxane | G |

5) Example of Description

Example 1 V2-BB(F)B-1

CH₂=CHCH₂CH₂—⟨ ⟩—⟨ F ⟩—⟨ ⟩—CH₃

Example 2 3-HB-CL

C₃H₇—⟨ ⟩—⟨ ⟩—Cl

Example 3 1O1-HBBH-5

H₃CO—⟨ ⟩—⟨ ⟩—⟨ ⟩—⟨ ⟩—C₅H₁₁

Example 4 3-BB(F,F)XB(F)-OCF3

C₃H₇—⟨ ⟩—⟨F,F⟩—CF₂O—⟨F⟩—OCF₃

Comparative Example 1

Example 39 was selected from among compositions disclosed in WO 1966-011897 A. The basis for the selection was because the composition contained the compound (4) and had the highest maximum temperature and the largest optical anisotropy. The composition had the following components and characteristics.

| | | |
|---|---|---|
| 3-HBXB(F,F)-F | (4) | 3% |
| 5-HBXB(F,F)-F | (4) | 8% |
| 3-HBXB-OCF3 | (4) | 5% |
| 2-HBB(F)-F | (4) | 8% |
| 3-HBB(F)-F | (4) | 8% |
| 5-HBB(F)-F | (4) | 16% |
| 5-HB-F | (4) | 6% |
| 7-HB-F | (4) | 6% |
| 5-HHB-OCF3 | (4) | 8% |
| 3-H2HB-OCF3 | (4) | 8% |
| 5-H2HB-OCF3 | (4) | 8% |
| 3-HH2B-OCF3 | (4) | 8% |
| 5-HH2B-OCF3 | (4) | 8% |

NI = 84.9° C.; Δn = 0.101; Δε = 5.5; Vth = 2.12 V; η = 16.6 mPa·s.

Comparative Example 2

Example 1 was selected from among compositions disclosed in JP 2003-176251 A. The basis for the selection was because the composition contained the compounds (3-3-1), (4) and (4-6), and had the highest maximum temperature and the largest optical anisotropy. The composition had the following components and characteristics.

| | | |
|---|---|---|
| 3-HHB(F)-F | (4) | 10.8% |
| 5-HHB(F)-F | (4) | 9% |
| 3-HH2B-OCF3 | (4) | 4.5% |
| 5-HH2B-OCF3 | (4) | 4.5% |
| 3-HB(F)BH-3 | (3-3-1) | 1.8% |
| 5-HB(F)BH-3 | (3-3-1) | 1.8% |
| 5-HB(F)BH-5 | (3-3-1) | 1.8% |
| 6-HB-F | (4) | 7.2% |
| 7-HB-F | (4) | 5.4% |
| 2-HHB-OCF3 | (4) | 7.2% |
| 3-HHB-OCF3 | (4) | 10.8% |
| 4-HHB-OCF3 | (4) | 6.3% |
| 5-HHB-OCF3 | (4) | 9.9% |
| 5-HB-F | (4) | 9% |
| V-HHXB(F,F)-F | (4-6) | 10% |

NI = 90.3° C.; Δn = 0.095; Δε = 5.6.

Example 1

It was found that the composition of Example 1 had a higher maximum temperature and a larger optical anisotropy than those of Comparative Example 1.

| | | |
|---|---|---|
| 5-HBB(F)B(F,F)XB(F,F)-F | (1-1-1-1) | 10% |
| V-HH-3 | (2-1-1) | 37% |
| 1V-HH-3 | (2-1-1) | 11% |
| V-HHB-1 | (2-4-1) | 11% |
| V2-HHB-1 | (2-4-1) | 3% |
| 2-BB(F)B-3 | (2-6-1) | 8% |
| 5-HBB(F)B-2 | (3-4-1) | 4% |
| 3-HBB(F,F)-F | (4-8-1) | 6% |
| 4-BB(F)B(F,F)XB(F,F)-F | (4-17-1) | 10% |

NI = 97.9° C.; Tc ≤ −30° C.; Δn = 0.119; Δε = 4.6; Vth = 2.51 V; η = 17.2 mPa·s; VHR-1 = 99.1%; VHR-2 = 98.2%; VHR-3 = 98.1%.

Example 2

It was found that the composition of Example 2 had a higher maximum temperature and a larger optical anisotropy than those of Comparative Example 2.

| | | |
|---|---|---|
| 5-HHB(F)B(F,F)XB(F,F)-F | (1-2-1-1) | 5% |
| 5-HHB(F,F)XB(F)B(F,F)-F | (1-2-2-1) | 5% |
| V-HH-4 | (2-1-1) | 20% |
| V-HH-5 | (2-1-1) | 10% |
| 1V-HH-3 | (2-1-1) | 11% |
| V-HHB-1 | (2-4-1) | 5% |
| 5-HBB(F)B-2 | (3-4-1) | 6% |
| 5-HBB(F)B-3 | (3-4-1) | 6% |
| 5-HB-CL | (4-1-1) | 5% |
| 3-HHXB(F,F)-F | (4-6-1) | 5% |
| 3-HBB-F | (4-7-1) | 6% |
| 3-BB(F,F)XB(F,F)-F | (4-11-1) | 6% |
| 3-HHBB(F,F)-F | (4-13-1) | 5% |
| 4-HHBB(F,F)-F | (4-13-1) | 5% |

NI = 109.0° C.; Tc ≦ −40° C.; Δn = 0.118; Δε = 4.5; Vth = 2.77 V; η = 25.6 mPa · s; VHR-1 = 99.2%; VHR-2 = 98.3%; VHR-3 = 98.2%.

Example 3

It was found that the composition of Example 3 had a higher maximum temperature and a larger optical anisotropy than those of Comparative Example 1.

| | | |
|---|---|---|
| 5-HB(F)B(F)B(F,F)XB(F,F)-F | (1-1-1-2) | 5% |
| 5-HB(F)B(F,F)B(F,F)XB(F,F)-F | (1-1-1-3) | 5% |
| V-HH-3 | (2-1-1) | 36% |
| 1-BB(F)B-2V | (2-6-1) | 6% |
| 2-BB(F)B-2V | (2-6-1) | 6% |
| 3-BB(F)B-2V | (2-6-1) | 11% |
| 1O1-HBBH-5 | (—) | 5% |
| 3-HHB-CL | (4-4-1) | 5% |
| 3-BB(F,F)XB(F,F)-F | (4-11-1) | 11% |
| 4-BB(F)B(F,F)XB(F,F)-F | (4-17-1) | 10% |

NI = 96.7° C.; Tc ≦ −30° C.; Δn = 0.147; Δε = 8.1; Vth = 1.85 V; η = 30.6 mPa · s; VHR-1 = 99.2%; VHR-2 = 98.3%; VHR-3 = 98.2%.

Example 4

It was found that the composition of Example 4 had a higher maximum temperature and a larger optical anisotropy than those of Comparative Example 2.

| | | |
|---|---|---|
| 5-HHB(F)B(F,F)XB(F,F)-F | (1-2-1-1) | 10% |
| 5-HB(F)B(F,F)XB(F)B(F,F)-F | (1-1-2-1) | 5% |
| V-HH-3 | (2-1-1) | 36% |
| V-HBB-1 | (2-5-1) | 10% |
| 3-HHEBH-3 | (3-1-1) | 5% |
| 3-HHEBH-4 | (3-1-1) | 5% |
| 3-HHEBH-5 | (3-1-1) | 5% |
| 4-HBB(F,F)XB(F,F)-F | (4-15-1) | 5% |
| 3-HHEB(F,F)-F | (4-20) | 10% |
| 2-HBEB(F,F)-F | (4-21) | 3% |
| 3-HBEB(F,F)-F | (4-21) | 3% |
| 5-HBEB(F,F)-F | (4-21) | 3% |

NI = 121.1° C.; Tc ≦ −40° C.; Δn = 0.108; Δε = 6.6; Vth = 2.01 V; η = 32.8 mPa · s; VHR-1 = 99.2%; VHR-2 = 98.3%; VHR-3 = 98.2%.

Example 5

| | | |
|---|---|---|
| 5-HHB(F)B(F,F)XB(F,F)-F | (1-2-1-1) | 5% |
| 5-HHB(F,F)XB(F)B(F,F)-F | (1-2-2-1) | 5% |
| 2-HH-5 | (2-1-1) | 11% |
| 3-HH-4 | (2-1-1) | 15% |
| 3-HH-5 | (2-1-1) | 5% |
| 3-HB-O2 | (2-2-1) | 5% |
| 3-HHB-1 | (2-4-1) | 10% |
| 5-HBB(F)B-2 | (3-4-1) | 5% |
| 5-HBB(F)B-3 | (3-4-1) | 5% |
| 2-HHB(F,F)-F | (4-5-1) | 10% |
| 3-HHB(F,F)-F | (4-5-1) | 10% |
| 3-HBB(F,F)-F | (4-8-1) | 14% |

NI = 100.7° C.; Tc ≦ −30° C.; Δn = 0.113; Δε = 5.2; Vth = 2.21 V; η = 20.4 mPa · s; VHR-1 = 99.1%; VHR-2 = 98.1%; VHR-3 = 98.1%.

Example 6

| | | |
|---|---|---|
| 5-HBB(F)B(F,F)XB(F,F)-F | (1-1-1-1) | 10% |
| V-HH-3 | (2-1-1) | 35% |
| 1V-HH-3 | (2-1-1) | 10% |
| V-HHB-1 | (2-4-1) | 10% |
| V2-HHB-1 | (2-4-1) | 6% |
| 5-HBB(F)B-2 | (3-4-1) | 5% |
| 3-HB-CL | (4-1-1) | 9% |
| 3-PyBB-F | (4-10-1) | 5% |
| 4-PyBB-F | (4-10-1) | 5% |
| 5-PyBB-F | (4-10-1) | 5% |

NI = 100.7° C.; Tc ≦ −30° C.; Δn = 0.120; Δε = 3.1; Vth = 2.67 V; η = 16.2 mPa · s; VHR-1 = 99.2%; VHR-2 = 98.2%; VHR-3 = 98.2%.

Example 7

| | | |
|---|---|---|
| 5-HHB(F)B(F,F)XB(F,F)-F | (1-2-1-1) | 10% |
| V-HH-3 | (2-1-1) | 35% |
| V-HHB-1 | (2-4-1) | 10% |
| 2-HB(F)BH-5 | (3-3-1) | 5% |
| 3-HB(F)BH-5 | (3-3-1) | 5% |
| 2-BB(F)B(F,F)-F | (4-9-1) | 5% |
| 3-BB(F)B(F,F)-F | (4-9-1) | 5% |
| 4-BB(F)B(F,F)-F | (4-9-1) | 5% |
| 5-BB(F)B(F,F)-F | (4-9-1) | 5% |
| 3-HHB(F)B(F,F)-F | (4-14-1) | 5% |
| 4-BB(F)B(F,F)XB(F,F)-F | (4-17-1) | 10% |

NI = 99.9° C.; Tc ≦ −30° C.; Δn = 0.132; Δε = 8.4; Vth = 1.67 V; η = 31.2 mPa · s; VHR-1 = 99.0%; VHR-2 = 98.2%; VHR-3 = 98.1%.

Example 8

| | | |
|---|---|---|
| 5-HBB(F)B(F,F)XB(F,F)-F | (1-1-1-1) | 5% |
| 5-HB(F)B(F,F)XB(F)B(F)-OCF3 | (1-1-2-2) | 5% |
| V-HH-3 | (2-1-1) | 30% |
| 1V-HH-3 | (2-1-1) | 5% |
| V-HHB-1 | (2-4-1) | 5% |
| 3-HHEBH-3 | (3-1-1) | 5% |
| 5-HBB(F)B-2 | (3-4-1) | 5% |
| 5-HBB(F)B-3 | (3-4-1) | 5% |
| 3-BB(F,F)XB(F)-OCF3 | (4-12-1) | 5% |
| 2-HGB(F,F)-F | (4-22) | 2% |
| 3-HGB(F,F)-F | (4-22) | 3% |
| 4-HGB(F,F)-F | (4-22) | 3% |
| 5-HGB(F,F)-F | (4-22) | 2% |
| 4-GHB(F,F)-F | (4-23) | 5% |
| 5-GHB(F,F)-F | (4-23) | 15% |

NI = 100.2° C.; Tc ≦ −30° C.; Δn = 0.105; Δε = 7.3; Vth = 1.68 V; η = 29.5 mPa · s; VHR-1 = 99.0%; VHR-2 = 98.1%; VHR-3 = 98.2%.

[Industrial Applicability]

The liquid crystal composition is suitable for use in an active matrix (AM) device and so forth. The liquid crystal composition has a character of a positive dielectric anisotropy so it is suitable for use a device of a twisted nematic (TN) mode, an optically compensated bend (OCB) mode, an in-plane switching (IPS) mode or a polymer sustained alignment (PSA) mode.

The invention claimed is:

1. A liquid crystal composition having a nematic phase that comprises three components, wherein a first component is at least one compound selected from the group of compounds represented by formulas (1-1) and (1-2), a second component is at least one compound selected from the group of compounds represented by formula (2), and a third component is at least one compound selected from the group of compounds represented by formula (3):

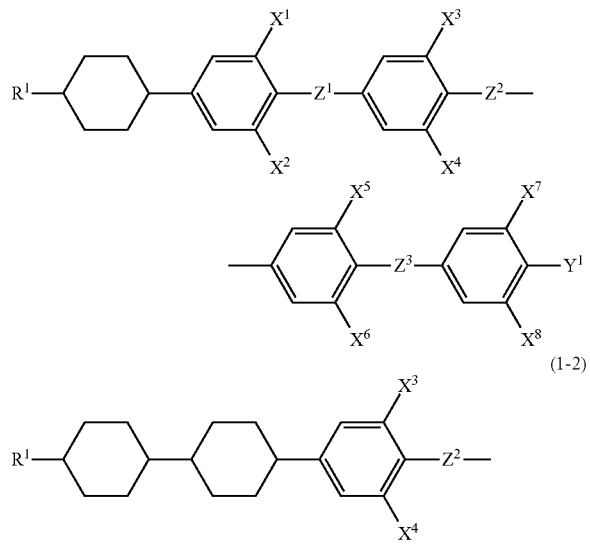

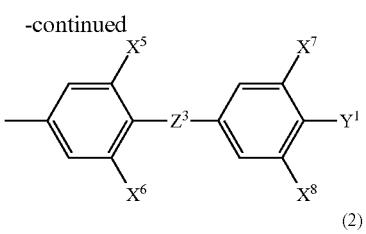

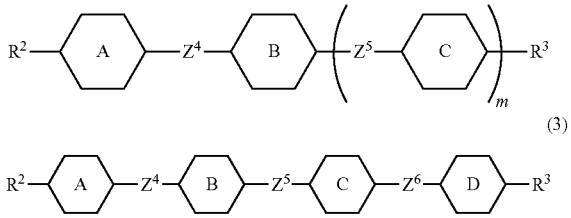

wherein $R^1$ is alkyl having 1 to 12 carbons, alkoxy having 1 to 12 carbons or alkenyl having 2 to 12 carbons; $R^2$ and $R^3$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring A, ring B, ring C and ring D are each independently 1,4-cyclohexylene, 1,4-phenylene, 2-fluoro-1,4-phenylene, 3-fluoro-1,4-phenylene, or 2,5-difluoro-1,4-phenylene; $Z^1$, $Z^2$ and $Z^3$ are each independently a single bond, ethylene, carbonyloxy or difluoromethyleneoxy; at least one of $Z^1$, $Z^2$ and $Z^3$ is difluoromethyleneoxy; $Z^4$, $Z^5$ and $Z^6$ are each independently a single bond, ethylene or carbonyloxy; $X^1$, $X^2$, $X^3$, $X^4$, $X^5$, $X^6$, $X^7$ and $X^8$ are each independently hydrogen or fluorine; $Y^1$ is fluorine, chlorine or trifluoromethoxy; and m is 0 or 1.

2. The liquid crystal composition according to claim 1, wherein the first component is at least one compound selected from the group of compounds represented by formulas (1-1-1) to (1-1-3), (1-2-1) and (1-2-2):

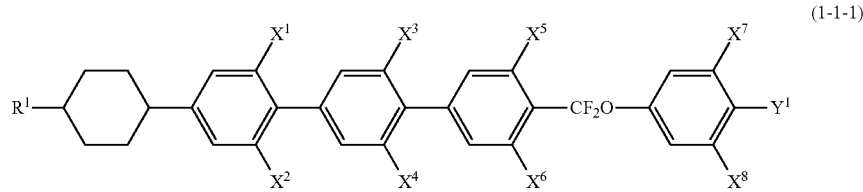

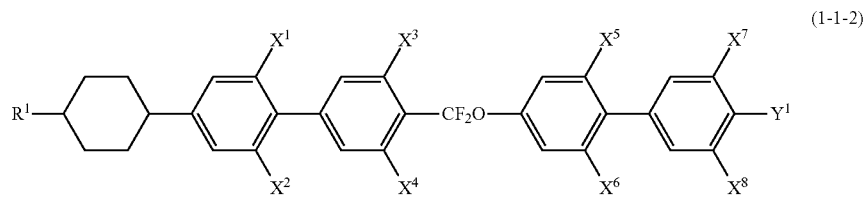

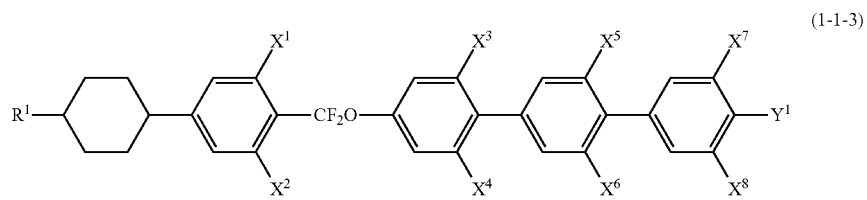

-continued

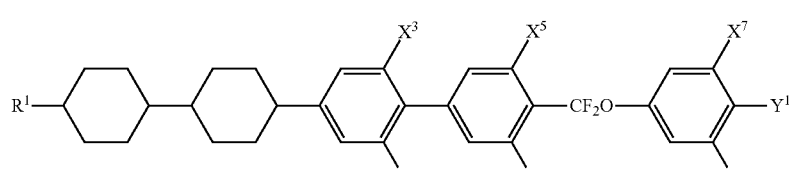
(1-2-1)

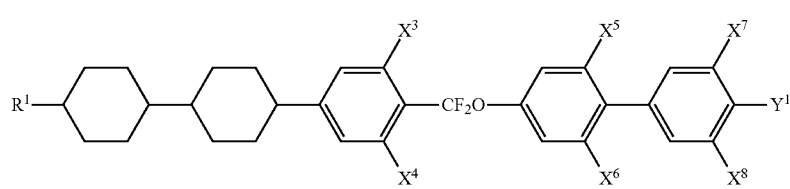
(1-2-2)

wherein $R^1$ is alkyl having 1 to 12 carbons, alkoxy having 1 to 12 carbons or alkenyl having 2 to 12 carbons; $X^1, X^2, X^3, X^4, X^5, X^6, X^7$, and $X^8$ are each independently hydrogen or fluorine; and $Y^1$ is fluorine, chlorine or trifluoromethoxy.

3. The liquid crystal composition according to claim 2, wherein the first component is at least one compound selected from the group of compounds represented by formulas (1-1-1) and (1-2-2).

4. The liquid crystal composition according to claim 1, wherein the second component is at least one compound selected from the group of compounds represented by formulas (2-1) to (2-6)

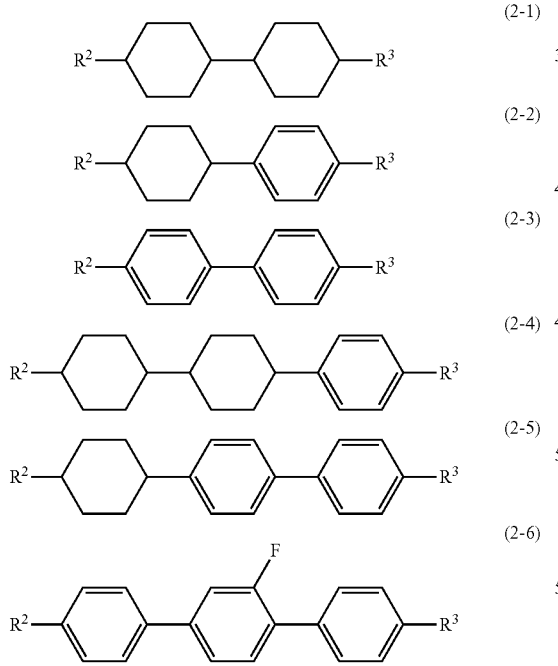

wherein $R^2$ and $R^3$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

5. The liquid crystal composition according to claim 4, wherein the second component is at least one compound selected from the group of compounds represented by formula (2-1).

6. The liquid crystal composition according to claim 4, wherein the second component is at least one compound selected from the group of compounds represented by formula (2-6).

7. The liquid crystal composition according to claim 4, wherein the second component is a mixture of at least one compound selected from the group of compounds represented by formula (2-1), and at least one compound selected from the group of compounds represented by formula (2-4).

8. The liquid crystal composition according to claim 4, wherein the second component is a mixture of at least one compound selected from the group of compounds represented by formula (2-1), and at least one compound selected from the group of compounds represented by formula (2-6).

9. The liquid crystal composition according to claim 4, wherein the second component is a mixture of at least one compound selected from the group of compounds represented by formula (2-1), at least one compound selected from the group of compounds represented by formula (2-4), and at least one compound selected from the group of compounds represented by formula (2-6).

10. The liquid crystal composition according to claim 1, wherein the third component is at least one compound selected from the group of compounds represented by formulas (3-1) to (3-4):

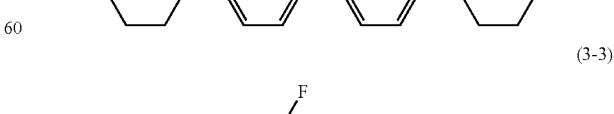
(3-1)

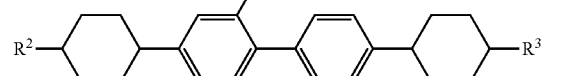
(3-2)

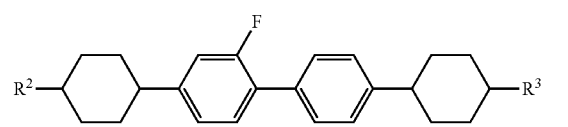
(3-3)

(3-4)

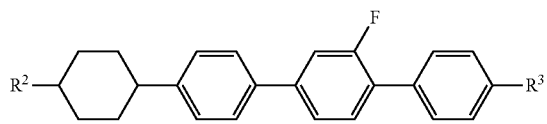

wherein R² and R³ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

11. The liquid crystal composition according to claim 10, wherein the third component is at least one compound selected from the group of compounds represented by formula (3-4).

12. The liquid crystal composition according to claim 1, wherein the ratio of the first component is in the range of 5% to 25% by weight, the ratio of the second component is in the range of 30% to 80% by weight, and the ratio of the third component is in the range of 5% to 25% by weight, based on the total weight of the liquid crystal composition.

13. The liquid crystal composition according to claim 1, wherein the composition further includes at least one compound selected from the group of compounds represented by formula (4) as the fourth component (4)

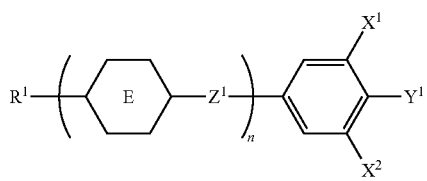

wherein R¹ is alkyl having 1 to 12 carbons, alkoxy having 1 to 12 carbons or alkenyl having 2 to 12 carbons; ring E is independently 1,4-cyclohexylene, 1,3-dioxane-2,5-diyl, 1,4-phenylene, 3-fluoro-1,4-phenylene, 3,5-difluoro-1,4-phenylene, or 2,5-pyrimidine; Z¹ is independently a single bond, ethylene, carbonyloxy, or difluoromethyleneoxy; X¹ and X² are each independently hydrogen or fluorine; Y¹ is fluorine, chlorine or trifluoromethoxy; and n is 1, 2 or 3.

14. The liquid crystal composition according to claim 13, wherein the fourth component is at least one compound selected from the group of compounds represented by formulas (4-1) to (4-17):

(4-1)
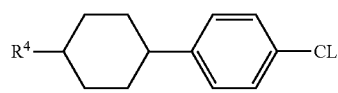

(4-2)
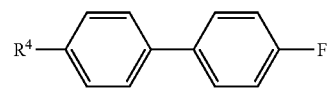

(4-3)
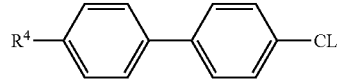

(4-4)

(4-5)
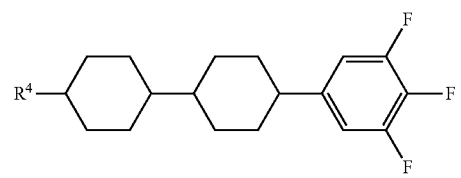

(4-6)
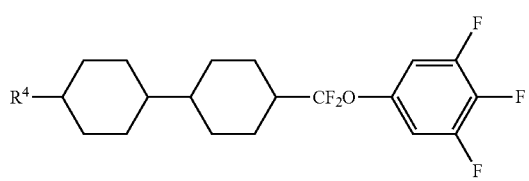

(4-7)
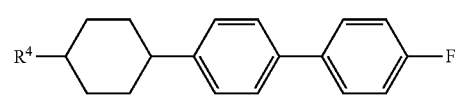

(4-8)
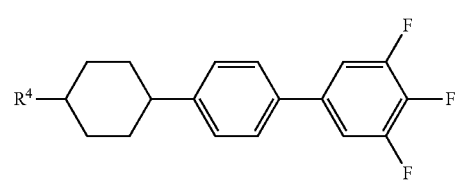

(4-9)
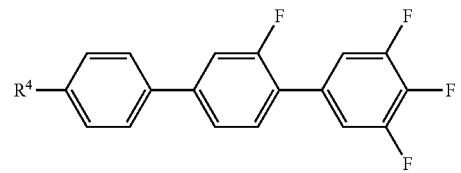

(4-10)

(4-11)
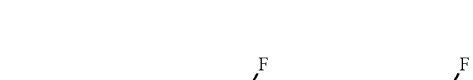

(4-12)
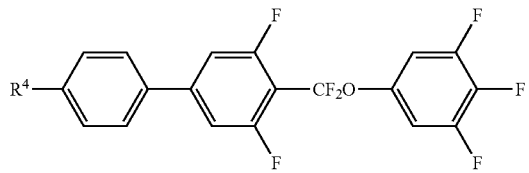

-continued (4-13)
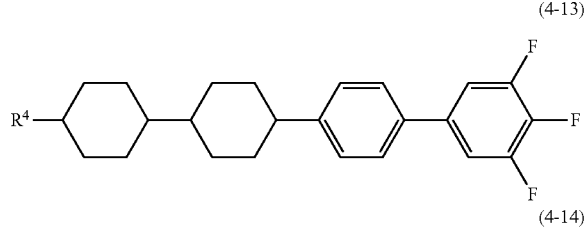

(4-14)
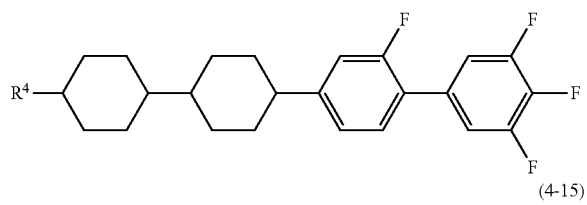

(4-15)
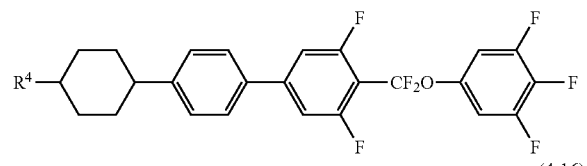

(4-16)
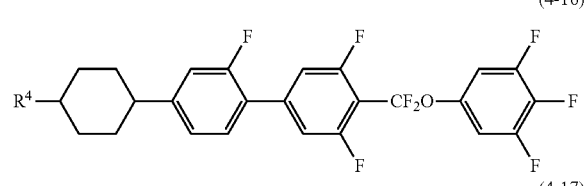

(4-17)
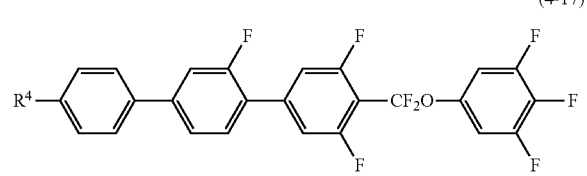

wherein $R^4$ is alkyl having 1 to 12 carbons, or alkenyl having 2 to 12 carbons.

15. The liquid crystal composition according to claim 14, wherein the fourth component is at least one compound selected from the group of compounds represented by formula (4-9).

16. The liquid crystal composition according to claim 13, wherein the ratio of the first component is in the range of 5% to 25% by weight, the ratio of the second component is in the range of 30% to 80% by weight, and the ratio of the third component is in the range of 5% to 25% by weight, and the ratio of the fourth component is in the range of 5% to 45%, based on the total weight of the liquid crystal composition.

17. The liquid crystal composition according to claim 1, wherein the composition has a maximum temperature of a nematic phase of 70° C. or more, an optical anisotropy (25° C.) at a wavelength of 589 nm of 0.08 or more, and a dielectric anisotropy (25° C.) at a frequency of 1 kHz of 2 or more.

18. A liquid crystal display device containing the liquid crystal composition according to claim 1.

19. The liquid crystal display device according to claim 18, wherein the operation mode of the liquid crystal display device is a twisted nematic (TN) mode, an optically compensated bend (OCB) mode, or an in-plane switching (IPS) mode, and the driving mode of the liquid crystal display device is an active matrix mode.

20. The liquid crystal display device according to claim 19, wherein the operation mode of the liquid crystal display device is a polymer sustained alignment (PSA) mode, and the driving mode of the liquid crystal display device is an active matrix mode.

\* \* \* \* \*